United States Patent [19]

Vogel

[11] Patent Number: 5,371,795
[45] Date of Patent: Dec. 6, 1994

[54] AUTOMATIC CENSORSHIP OF VIDEO PROGRAMS

[75] Inventor: Peter S. Vogel, Faulconbridge, Australia

[73] Assignee: Right Hemisphere Pty., Ltd., Faulconbridge, Australia

[21] Appl. No.: 985,241

[22] Filed: Dec. 2, 1992

Related U.S. Application Data

[63] Continuation-in-part of Ser. No. 582,879, Oct. 12, 1990, abandoned.

[30] Foreign Application Priority Data

May 4, 1988 [AU] Australia .................... PJ0278

[51] Int. Cl.$^5$ .............................................. H04K 1/00
[52] U.S. Cl. .................................. 380/23; 380/20;
455/2; 455/4.1; 455/4.2; 340/825.31;
340/825.34; 348/1; 348/6; 348/10
[58] Field of Search ................. 380/3, 5, 20, 23;
358/84, 349; 455/2, 4.1–6.3; 340/825.31,
825.34; 348/1, 6, 9, 10

[56] References Cited

U.S. PATENT DOCUMENTS

| | | | |
|---|---|---|---|
| 4,163,253 | 7/1979 | Morio et al. | 380/5 |
| 4,228,543 | 10/1980 | Jackson | 455/181.1 |
| 4,305,101 | 12/1981 | Yarbrough et al. | 360/69 |
| 4,520,404 | 5/1985 | Von Kohorn | 358/84 X |
| 4,768,229 | 8/1988 | Benjamin et al. | 380/20 |
| 4,890,322 | 12/1989 | Russell, Jr. | 380/20 |
| 4,903,031 | 2/1990 | Yamada | 358/349 X |
| 4,930,160 | 5/1990 | Vogel | 380/23 |
| 4,989,245 | 1/1991 | Bennett | 380/23 |
| 5,036,537 | 7/1991 | Jeffers et al. | 380/20 |
| 5,046,090 | 9/1991 | Walker et al. | 380/5 |
| 5,046,092 | 9/1991 | Walker et al. | 380/20 |

FOREIGN PATENT DOCUMENTS

| | | | |
|---|---|---|---|
| 2162983 | 8/1987 | Australia | H04B 1/16 |
| 0179001 | 4/1986 | European Pat. Off. | H04M 11/08 |
| 8302208 | 6/1983 | WIPO | H04N 7/04 |
| 8403166 | 8/1984 | WIPO | G11B 5/02 |

Primary Examiner—Bernarr E. Gregory
Attorney, Agent, or Firm—Cushman, Darby & Cushman

[57] ABSTRACT

A system for controlling reception or recording of television broadcasts according to censorship classifications. One or more persons monitoring broadcasts nominate a classification and cause an appropriate signal to be generated and transmitted to viewers' homes by means of a radio transmission network also used for transmission of other data signals, such as a pocket paging system. Means are provided to ensure that classification signals are transmitted with priority over paging signals or other non-time-critical data.

22 Claims, 4 Drawing Sheets

AUTOMATIC CENSORSHIP OF VIDEO PROGRAMS

This is a continuation-in-part of application No. 07/582,879, filed on Oct. 12, 1990, which was abandoned upon the filing hereof.

TECHNICAL FIELD

The present invention relates to methods of, and apparatus for, automatic censorship of broadcast programs. The term broadcast program used hereinafter refers to broadcast television programs, radio programs, cable television, and other forms of mass distribution of audio and/or video programs.

BACKGROUND ART

The need for censorship of video material is generally accepted by most societies, for the purposes of preventing the viewing of material by persons other than the target audience. Usually, such censorship takes the form of limiting access of a certain group of people, for example children, to a certain class of material, for example pornographic or violent movies. Other uses of censorship include voluntary self-censorship in cases where a recipient of a program does not wish to be exposed to certain types of program, for example scenes of great violence or advertisements which may be considered offensive by some people.

Being the most widely distributed form of broadcasting, television is the medium in which censorship is most likely to be considered a problem. Traditionally, censorship of television takes the form of either preventing possibly offensive material from being broadcast in the first place, or voluntary self-censorship, that is, switching off the receiver when material which the viewer does not wish to experience is being broadcast. While such self-censorship offers the benefit that programs remain available to those who do not find them objectionable, it suffers from the inconvenience of having to anticipate the nature of broadcasts and operate the receiver appropriately. This process is tedious and error-prone, especially where the viewer wishes to suppress program material which changes rapidly in nature, for example when the viewer desires to suppress commercial messages within an otherwise unobjectionable program. Manual censorship is therefore not an entirely satisfactory solution.

Another factor which renders manual censorship ineffective is the increasingly common use of videotape recorders for recording programs for later replay. If an operator is present at the time of recording, unwanted program can be suppressed by "pausing" the video recorder when appropriate, but in many cases such recording takes place unattended and at these times such manual censorship is not possible.

It is therefore desirable to provide means whereby display or recording of preselected classes of program material can be automatically suppressed.

Arrangements for automatic censorship have been previously published, but suffer from a number of serious shortcomings. The main difficulty is that automatic means for recognising different program classifications, for example detection of television commercials, have been complex and unreliable. One technique has been to detect television commercials by the short period of black picture and silence separating them from other program material. A typical commercial-deleter of this type is disclosed in U.S. Pat. No. 4,319,286. This system and others like it suffer from the problem that erroneous operation occurs if there is a brief period of black and silence in a broadcast at a time other than at the beginning of a commercial break, or if there is no separation between commercials and other program material. Furthermore, such systems are unable to distinguish between resumption of desired program and further commercials at the conclusion of a commercial. Resumption of viewing or recording must therefore be controlled by some form of timing device, based on assumptions regarding the length of commercial breaks. If these assumptions are not correct, the system will fail in its function.

A much improved censorship means is disclosed by Von Kohorn in U.S. Pat. No. 4,520,404. This system relies on a human operator to classify broadcasts, based on observation at a monitoring station. A suitably coded message is distributed from the monitoring station to the viewer's home, at which point a suitably-equipped decoder controls the television receiver or video recorder in accordance with the classification data generated by the human operator at the monitoring station. Although this invention significantly improves upon the reliability of previous methods, it nevertheless suffers from a number of significant limitations.

The main limitation of the prior art arises from the means of distribution of classification data to the viewer's home. In the Von Kohorn patent cited above, the system relies on a special-purpose radio broadcast, a special-purpose cable connection or specially-encoded control signals accompanying the broadcast to be censored as the means of distribution of classification data. The provision of special purpose radio broadcasts presents the problems of cost and complexity of establishing suitable transmitters, which must be capable of delivering suitable signals to all users of the service, as well as the difficulty and expense of obtaining such license as may be required by communications authorities. Distribution by cable suffers from the high cost of establishing of suitable cabling, or difficulty of securing a suitable channel within a cable network already in place. Distribution by means of encoded signals accompanying the subject broadcasts is difficult to achieve as it requires the cooperation of the broadcasters.

DISCLOSURE OF INVENTION

According to a first aspect of the present invention, there is provided an automatic censorship method capable of automatically censoring broadcast programs which does not require the establishment of a special broadcasting means or the cooperation of the broadcaster from whom the programs originate, comprising the steps of monitoring broadcasts originating from at least one source, classifying programs according to their content, generating a message describing the classification of the current programs, conveying said message to a data message transmitting station, temporarily suspending data messages (if any) being transmitted, transmitting said classification message, receiving said classification message at a plurality of receiving stations at which the classified programs are being viewed or recorded, decoding said message and, according to functions selected by the operator at the receiving station, controlling the reception, display, audition or recording of the classified programs. The term "data message" as used herein refers to signals conveying information of a non-time-critical nature, that is, signals which convey information and can be interrupted for short periods, say one second, without significantly detracting from the quality or effectiveness of the transmission. Examples of such data messages include transmissions to pocket-paging receivers, teletext data or financial information being continuously transmitted to a group of subscriber stations.

According to a second aspect of this inventive concept, apparatus for automatically censoring broadcast programs is also provided, and comprises means for monitoring broadcasts originating from at least one source, means for generating a message describing the classification of the current programs according to classifications determined by an operator performing the monitoring, means for conveying said message to a data message transmitting station, a controller equipped to temporarily suspend messages (if any) being transmitted, radio transmitter means for transmitting said classification message, receivers which receive said classification message at a plurality of receiving stations at which the classified programs are being viewed or recorded, means to decode said message and, according to functions selected by the operator at the receiving station, for controlling the reception, display, audition or recording of the classified programs.

The invention also consists in transmission means as defined in the previous paragraph.

An important application is to a system in which monitoring of broadcasts from a plurality of sources occurs. Embodiments of the invention can readily provide such a feature.

Another feature times the sending of messages such that the potential for corruption of the message by the data is minimized. According to a specific aspect of the present invention, data messages and classification messages are buffered and sent only at appropriate times where the integrity of the other message will not be compromised.

Still another feature modulates some aspect of the data message to represent the classification message. No suspension of transmission is therefore necessary.

Another further inventive feature which is used in preferred embodiments of the invention, is an arrangement by which the monitoring is performed by two or more persons each of whom independently classifies programs according to their content; the system automatically generates a message describing the current classification according to the classification selected by a majority of the monitoring persons.

BRIEF DESCRIPTION OF DRAWINGS

An embodiment of the present invention will now be described, by way of example only, with reference to the drawings in which.

MODE FOR CARRYING OUT THE INVENTION

Figure 1:
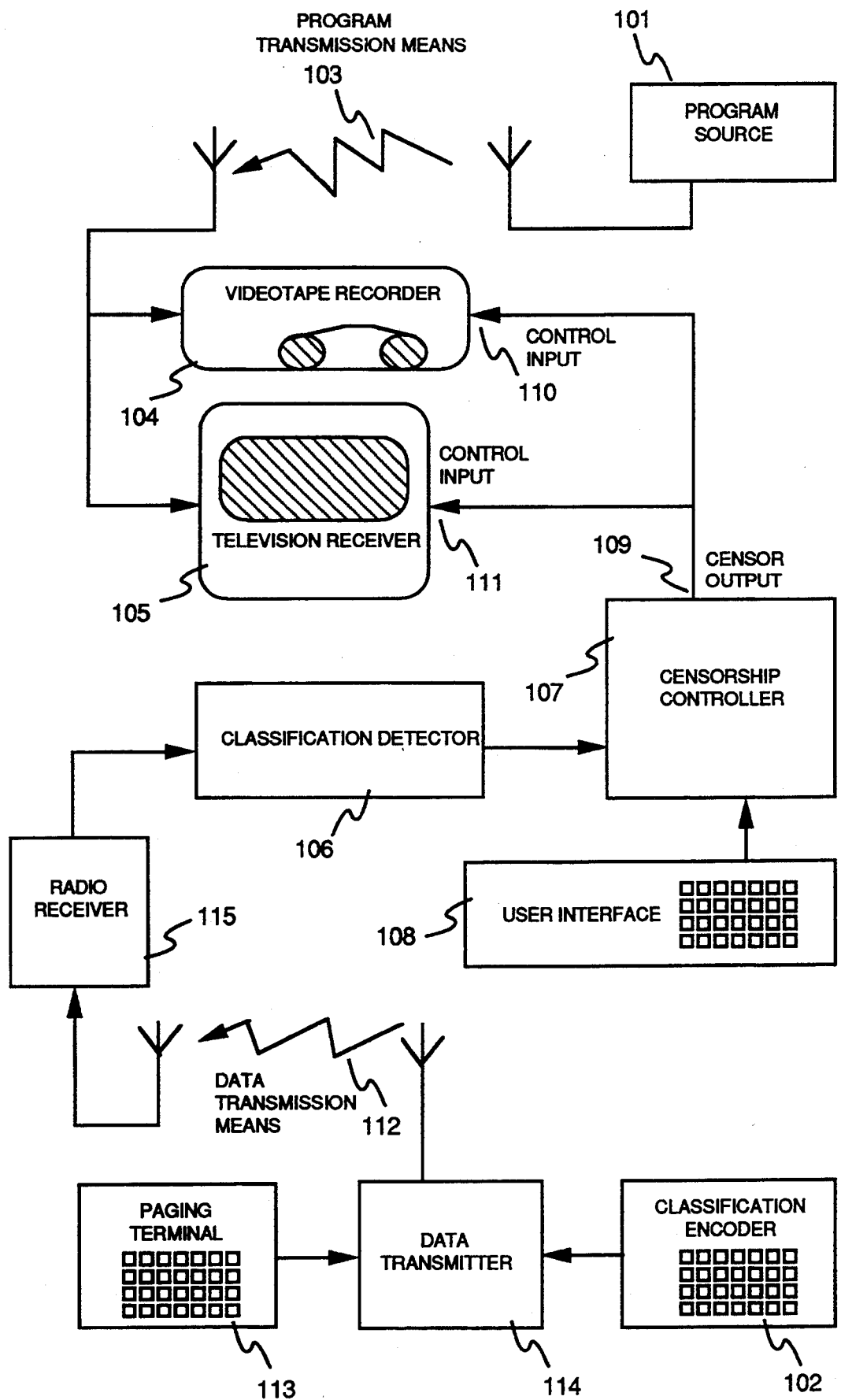
FIG. 1 is a schematic block diagram of an embodiment of the present invention.

As seen in FIG. 1, program source 101 is a videotape recorder, television camera, television studio or other source of video program. Classification encoder 102 is an encoder comprising a keyboard by means of which a censorship classification can be entered by the operator and encoding means which translates the entered classification into a unique digital word. Classification encoder 102 can also comprise means for inputting information defining to which channel of broadcast the entered classification data relates. In these embodiments, the data message transmitter of the invention is a paging system transmitter (referred to hereinafter as data transmitter 114), as commonly used in pocket-paging services, whereby on transmission of suitable address codes, portable receivers are activated to beep or display messages, alerting the user carrying the receiver. The output of classification encoder 102 is fed to data transmitter 114. Said transmitter is also equipped to receive data from paging terminal 113, which is a conventional paging terminal into which messages to be transmitted to remotely-located paging receivers are entered by an operator. Operation of the paging system is carried out according to any of the methods well known to the art, except that data from classification encoder 102 is interleaved with data from paging terminal 113. Interleaving of paging and classification data is performed according to a scheme which ensures that classification data does not interfere with the operation of the paging system and that paging data does not interfere with operation of the classification and censorship system. One suitable embodiment of data transmitter 114 is shown in the schematic drawing FIG. 2, described in detail below. The program from program source 101 is transmitted to the point of viewing or recording via program transmission means 103. The censorship classification signal interleaved with paging signals is transmitted to the same destination via data transmission means 112. Radio receiver 115 receives both paging and classification signals and feeds the demodulated data to classification detector 106 which is equipped to ignore paging signals but to extract and process classification signals. Censorship controller 107 receives the extracted classification word, and compares it with a range of classifications previously entered by the operator using user interface 108. If the current classification matches one of those selected to be censored by the operator, censor output 109 activates control input 110 of the video tape recorder and/or control input 111 of the television receiver, causing certain automatic censorship actions to happen. In this embodiment, the desired actions are selected by the operator and can include the following examples:

a) Inhibit reception of both sound and picture Example: television only receives programs suitable for children b) Mute sound but continue displaying picture Example: remove sound during advertisements c) Blank picture but continue sound Example: Remove visual content from news programs d) Switch to alternative program Example: Replace advertisements with soothing images of tropical fish, news and information items from Teletext or other source, or alternative advertisements from another source e) Pause recording of program onto videotape Example: Remove advertisements from recorded movies f) Enable record of program onto videotape Example: Record all advertisements for motor vehicles.

In other simpler embodiments of the invention, the censorship action can be predetermined by the arrangement of the apparatus.

Where more than one channel of broadcast is available, it is desirable to permit selective operation of censorship based on which channel is being viewed or recorded. To facilitate this, classification encoder 102 can be equipped to produce channel-specific classification data at its output, and censorship controller 107 can be equipped to activate censor output 109 only if the corresponding channel is being viewed or recorded. Information defining the currently active channel can be derived manually, via user interface 108, or automatically by connection to the broadcast reception means or by other techniques which may not require direct electrical connection.

Figure 2:
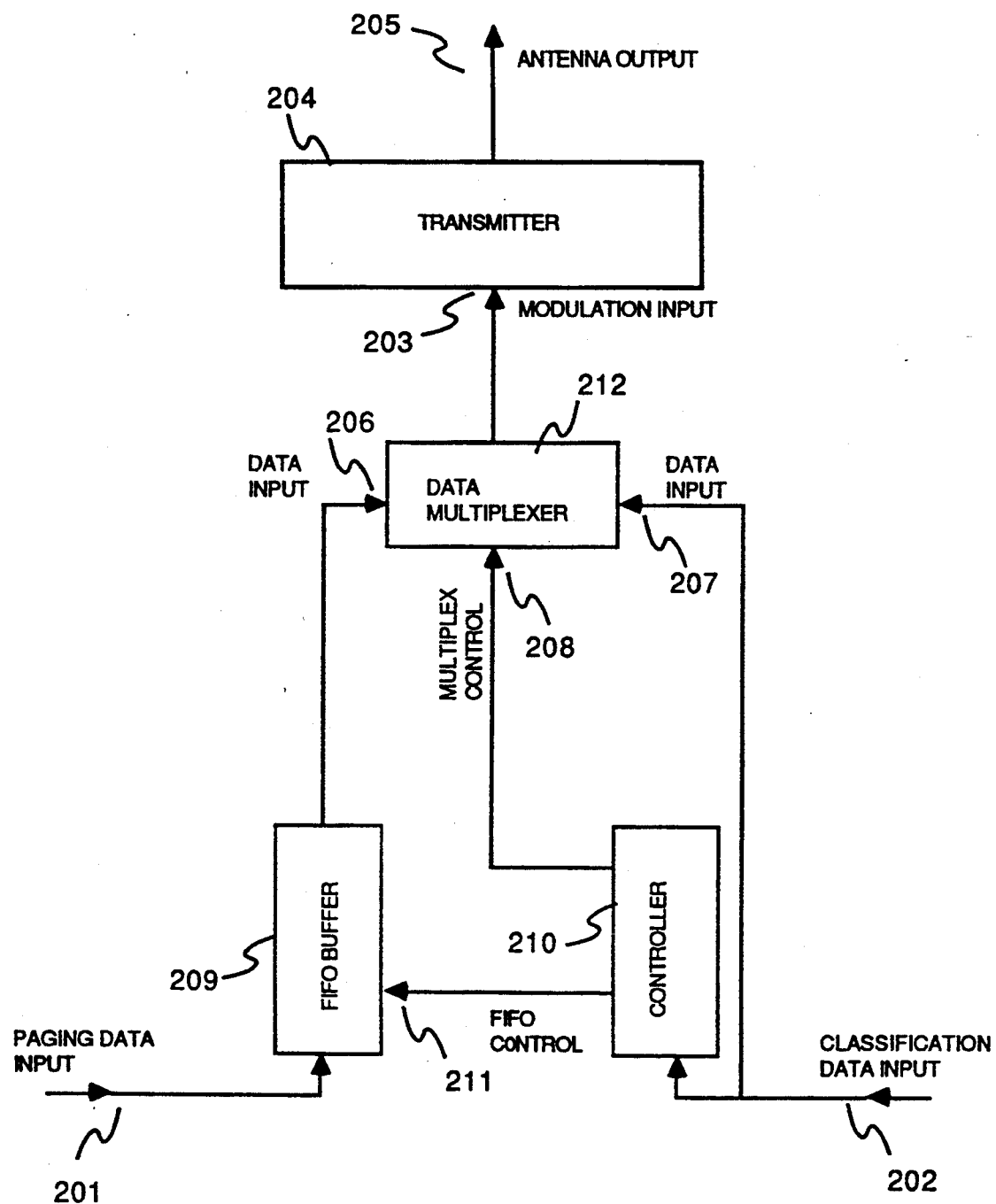
FIG. 2 is a schematic block diagram of a suitable arrangement of the data transmitter of FIG. 1.

Referring now to FIG. 2, detail of data transmitter 114 of FIG. 1 can be seen. Paging data arriving at paging data input 201 is fed to the input of FIFO buffer (first in, first out buffer) 209, before being passed via data multiplexer 212 to modulation input 203 of transmitter 204. Transmitter 204 transmits a carrier, modulated accordingly, via antenna output 205. Classification data is fed via classification data input 202 directly to data multiplexer 212, as well as to an input of controller 210. Controller 210 is arranged so that when classification data arrives, FIFO buffer 209 is instructed, via FIFO control 211, to suspend its output, and data multiplexer 212 is instructed, via multiplex control 208, to select the classification data input 202 as the source of modulation for the transmitter. In this way paging data which may be en route to the transmitter at a time when classification data is to be transmitted will be temporarily suspended until transmission of the classification data has been completed. During this time, any paging data received at paging data input 201 will be stored by FIFO buffer 209 so that it is not lost. The result of this arrangement is that classification data, which is required to be transmitted urgently, will be transmitted with precedence over paging data. The small delay in completing the paging message does not materially affect the operation of the paging system.

The data interleaving function described above can conveniently be implemented by a microprocessor equipped with suitable software, or by an appropriate arrangement of electronic hardware.

In this embodiment, the suspension of data messages occurs at a point in the message data stream determined by the precise moment at which a classification data signal arrives at the input of controller 210. Depending on when suspension occurs relative to the message signal, a message receiver may or may not recover correctly when the message resumes.

Figure 2A:
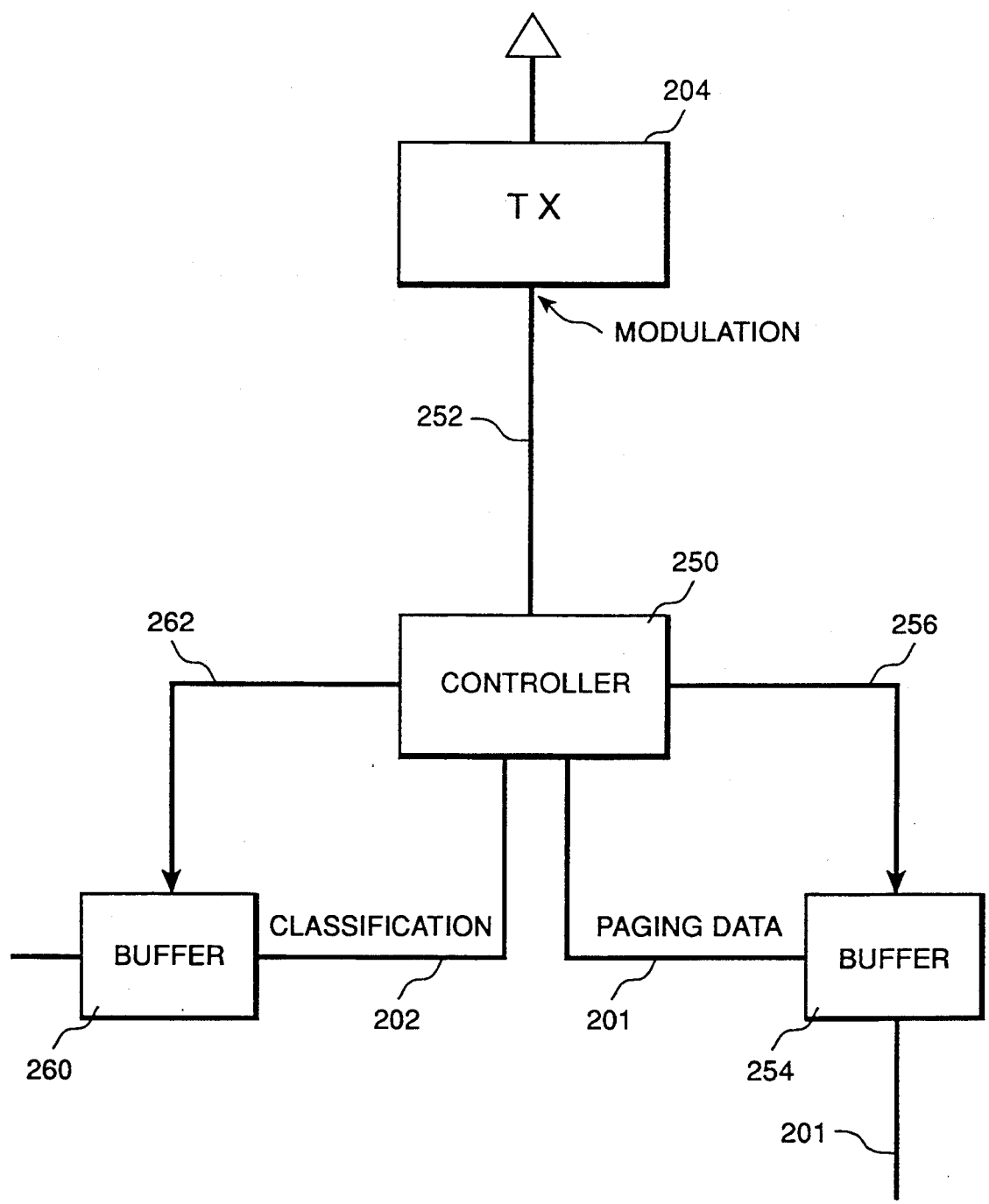
FIG. 2A is a schematic block diagram of an alternate arrangement of the data transmitter.

A second embodiment of the invention shown in FIG. 2A is used in cases where this potential for corruption is to be avoided. This second embodiment times suspension of message transmission to minimize interference to any data messages that may be in progress. In this embodiment, a controller 250 receives as inputs both data messages 201 normally used for paging and classification messages 228. It outputs a single multiplexed message signal 252 which feeds the transmitter's modulation input.

All paging data and classification data is buffered via buffers 254 and 260 respectively. The controller continually monitors any paging messages in progress and in the absence of classification messages transfers the paging message to its output. When a classification message arrives, the controller passes the classification message to its output only if no data message is in progress. Any data messages arriving while a classification message is in progress are held in buffer 254. At the conclusion of the classification message a control signal 256 is sent to buffer 254 to indicate that the data should be re-sent. Similarly, if message data is in progress when a classification message arrives, the controller temporarily holds it in buffer 260 until a suitable point in the data message is reached, at which point it is read out by signal 262. The controller then begins holding the data messages in buffer 254 and transmitting the classification message instead. On completion of the classification message, transmission of the buffered data message is resumed; beginning with the information stored in buffer 254.

Although in this embodiment of the invention there is some delay in transmission of classification messages, the delay is small compared to the delay that could occur if classification messages are transmitted only when no data message is present.

The optimum point at which data messages are suspended depends on the protocol being used for the data messages. The preferred mode of this invention uses a POCSAG (Post Office Standardization Advisory Group) protocol used by most paging systems. Then the controller operates according to the following rules:

1. If a classification message arrives during the POCSAG preamble or address word, stop transmission immediately, transmit the classification signal, then repeat the POCSAG frame from the beginning.

2. If a classification message arrives during the POCSAG batch but not within a message, the sync and idle code words can be aborted while a classification message is transmitted. The paging message is resumed by re-transmitting the complete frame.

Figure 3:
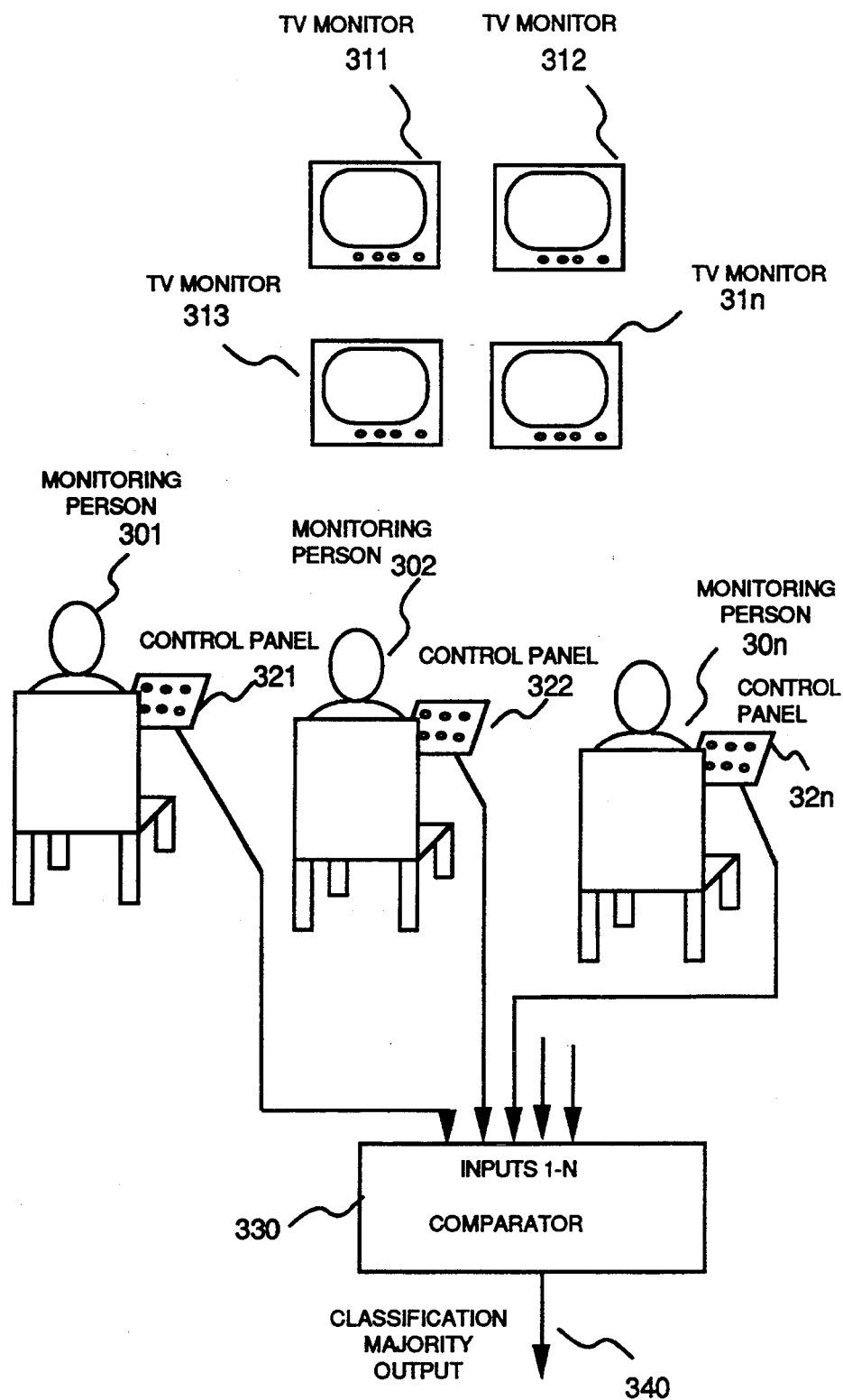
FIG. 3 is a schematic block diagram of an alternative monitoring arrangement suitable for use with the invention.

3. If a classification message arrives during a POCSAG message, wait until the end of the message codeword, transmit the classification message, then resume the POCSAG message from the point at which it was suspended. To ensure that classification messages are not received by pagers, the codes used for classification messages are chosen from those not recognized by pagers.

Where the invention is being used to control censorship of a plurality of channels, it becomes difficult for one monitoring person to classify the programs accurately. In this case this embodiment of the invention can be adapted to use the arrangement of FIG. 3, whereby a plurality of monitoring persons are used to perform the classification function. As seen in FIG. 3, each monitoring person 301-30n, views a group of television monitors 311-31n, each monitor displaying the broadcast of a different television channel. Each person enters the appropriate classification for each channel, or a sub-set of channels, at their own control panel 321-32n. The outputs of the control panels feed comparator 330, which generates at its output a signal 340 corresponding to the majority of inputs from the control panels. This output feeds the classification data input 202 of FIG. 2. An alternative arrangement is possible, whereby each monitoring person monitors only one channel, however the arrangement described above is preferable because an error made by one person will not necessarily result in incorrect censorship action at viewers' homes, since the classification transmitted reflects the classification decision of the majority of the monitoring persons.

In any embodiment of the invention, a security arrangement may be provided to enable authorized persons to enable and disable the censorship of programs. In FIG. 1 this feature may be implemented by equipping censorship controller 107 with storage means within which a "personal identification number" (PIN) is stored. By means of user interface 108, an authorized person, to whom the PIN is known, can enter the PIN, thereby enabling access to latches or other memory means within censorship controller 107, the state of which defines the classes of programs which will be censored. In this way a responsible adult, for example, could upon entering the correct PIN, disable the censorship function so that material unsuitable for children could be viewed. Resumption of the usual censorship function can be effected by again entering the PIN, after a preset time delay, or upon conclusion of the program.

According to a third embodiment of the invention, the data message is not suspended when a classification message is to be transmitted. Rather, some aspect of the data message is altered in a way which is indicative of the classification message. for example, the classification message may be broadcast by imposing a secondary modulation on the same carrier as that which conveys the data message. It is preferable that the secondary modulation scheme be arranged so that it will be transmitted correctly by a data message transmission network designed to transmit only data messages.

In the preferred case of a POCSAG paging network, this secondary modulation can be accomplished by modulating the timing of the digital pulses in such a way as to be transparent to pagers receiving the signals. The preferred way is by delaying or advancing edges of pulses from their nominal positions by 100 microseconds, representing binary one or zero respectively. This timing modulation representative of the classification signal can be detected by suitably-equipped classification signal receivers which ignore the paging signal modulation.

The foregoing describes only some embodiments of the present invention and modifications, obvious to those skilled in the art, can be made without departing from the scope of the present invention. For example, whereas the embodiment of the invention described above and the associated drawings refer to the use of a paging system as the classification message conveyance means of the invention, this is by way of example only, and any transmitter of non-time-critical data messages can be used.

Whereas the embodiment of the invention described above refers to the classification signal input to the data transmitter as originating from control panels operated by monitoring persons, it is envisaged that automated means can be applied instead of the monitoring persons without departing from the scope of the invention.

While the classification detector and censorship controller are described in these embodiments as being distinct from the television reception or recording equipment, this apparatus can be incorporated within other equipment such as a television receiver, monitor, or video tape recorder.

For the purpose of implementing the present invention without needing to modify the videotape recorder and/or television receiver, control inputs 110 and 111 of FIG. 1 can be the remote control interface of the video-tape recorder and/or television receiver in cases where these are equipped with remote control. That is, the censorship controller 107 is equipped with interface means compatible with the remote control communication standard, for example an infra-red transmitter, so that pausing, muting, blanking, channel-changing, or other censorship actions can be effected using unmodified recording/receiving equipment.

In cases where great flexibility of user interface is required, a video display device can be used to display the range of available censorship categories in the form of a menu, and the operator can make selections from that menu using a small number of switches, according to techniques well known to the computer art.

Whereas the embodiments described herein refer to use of the invention for deletion of unwanted material from recording or viewing, the invention can also be adapted to provide other useful control functions. For example, the invention can be arranged to cause only nominated types of material to be recorded. This capability can be used for compiling a recording of all the advertisements broadcast on a given day, or all the episodes of a particular program broadcast over several nights. The invention can also be used to control recording of pre-determined programs by starting and stopping the VCR at the actual times of commencement and termination of the desired program, rather than relying on the clock means commonly incorporated into VCRs for this purpose. The method of control using this invention is superior in that the correct program segment will be recorded in spite of differences between the scheduled times of programs and their actual starting and finishing times.

INDUSTRIAL APPLICABILITY

The invention can be used to control reception or recording of television programs according to their censorship classification.

I claim:

1. An automatic censorship method for automatically censoring broadcast programs, comprising the steps of:
   monitoring broadcasts originating from at least one source;
   generating a classification message describing a program being monitored;
   conveying said classification message to a data message transmitting station which is normally transmitting message information;
   temporarily suspending transmission of said message information being transmitted by said data message transmitting station responsive to receiving said classification message;
   transmitting said classification message while said message information is suspended, on a same channel as a channel on which said message information is usually transmitted;
   resuming transmitting said message information when said classification message transmitting is complete;
   receiving said classification message at a plurality of receiving stations;
   decoding said classification message; and
   according to functions selected by the operator at the receiving station, controlling the reception, display, audition or recording of the classified programs.

2. An automatic censorship method according to claim 1 wherein said data message transmitting station paging service transmission station.

3. A method as in claim 1 wherein said temporarily suspending step occurs substantially immediately when receiving said classification message.

4. A method as in claim 1 wherein said temporarily suspending step occurs some time after receiving said classification message, at a time to minimize a potential for corruption of said message information.

5. An automatic censorship method for automatically censoring broadcast programs, comprising the steps of:
monitoring broadcast originating from at least one source;
generating a classification message describing a program being monitored;
conveying said message to a data message transmitting station;
temporarily suspending transmission of any other data being transmitted by said data message transmission station;
transmitting said classification message;
receiving said classification message at a plurality of receiving stations;
decoding said message; and
according to functions selected by the operator at the receiving station, controlling the reception, display, audition or recording of the classified programs;
wherein the step of generating a classification message describing a program being monitored is performed by a plurality of persons, each of whom enters a perceived classification into a comparator adapted to generate a classification output according to the classification entered by a majority of said persons.

6. A method as in claim 5 wherein said temporarily suspending step occurs substantially immediately when receiving said classification message.

7. A method as in claim 5 wherein said temporarily suspending step occurs some time after receiving said classification message, at a time to minimize a potential for corruption of said message information.

8. Automatic broadcast program censorship means comprising:
means for monitoring broadcasts originating from at least one source;
means for generating a classification message describing a program currently being monitored;
means for conveying said classification message to a data message transmitting station which is normally transmitting message information;
a controller equipped to temporarily suspend transmission of said message information being transmitted by said data message transmitting station responsive to receiving said classification message;
radio transmitter means for transmitting said classification message while said message information is suspended, on a same channel as said message information is usually transmitted and resuming transmitting said message information when said classification message transmitting is complete;
a receiver which receives said classification message;
means to decode said classification message; and
means for controlling the reception, display, audition or recording of the classified programs according to functions selected by the operator at the receiving station.

9. Automatic broadcast program censorship means according to claim 8, wherein said data message transmitting station is a paging service transmission station.

10. A means as in claim 8 wherein said radio transmitter means suspends said message information substantially immediately when receiving said classification message.

11. A means as in claim 8 wherein said radio transmitter means suspends said message information substantially some time after receiving said classification message, at a time to minimize a potential for corruption of said message information.

12. Automatic broadcast program censorship means comprising:
means for monitoring broadcasts originating from at least one source;
means for generating a classification message describing a program currently being monitored;
means for conveying said message to a data message transmitting station;
a controller equipped to temporarily suspend transmission of any other messages being transmitted by said data message transmitting station;
a receiver which receives said classification message;
means to decode said message; and
means for controlling the reception, display, audition or recording of the classified programs, according to functions selected by the operator at the receiving station, wherein said means for generating a classification message describing a program currently being monitored comprises:
a plurality of accepting stations, each of which accepts a perceived classification into selection means; and
a comparator adapted to receive input from said selection means and to generate a classification output according to the classification entered by a majority of said stations.

13. A means as in claim 12 wherein said controller suspends said message information substantially immediately when receiving said classification message.

14. A means as in claim 12 wherein said controller suspends said message information substantially some time after receiving said classification message, at a time to minimize a potential for corruption of said message information.

15. A data transmitter comprising:
means for receiving non-time-critical data signals to be transmitted to remote data message receiving terminals;
means for receiving a classification signal descriptive of a broadcast program;
radio transmission means for transmitting said received non-time-critical data signals in the absence of received classification signals; and
controller equipped, on receipt of a classification signal, to suspend temporarily transmission of non-time-critical data signals and to cause said classification signal to be transmitted.

16. A transmitter as in claim 15 further comprising means for timing suspension of said data messages to a point which ensures their integrity.

17. A transmitter as in claim 16 wherein said data messages are paging messages, and the transmission follows the following rules:
1) If a classification message arrives in a non-information-carrying part of said data message, stop transmission immediately, transmit the classification signal, then repeat the data message entirely, and
2) If a classification message arrives during an information-carrying part of said data message, wait until the end of a unit of the message, transmit the classification message, then resume the message from the point at which it was suspended.

18. A data transmitter comprising:
means for receiving non-time-critical data signals to be transmitted to remote data message receiving terminals;

means for receiving a classification signal descriptive of a broadcast program;

radio transmission means for transmitting said received non-time-critical data signals; and a controller equipped, on receipt of a classification signal, to alter some aspect of non-time critical data signals being transmitted based on said classification signal.

19. A transmitter as in claim 18 wherein said aspect is an aspect of the modulation used by said radio transmission means to transmit said received non-time-critical data signals.

20. A system as in claim 19 wherein said data signals are paging signals, and the aspect is altered by delaying or advancing edges of pulses from nominal positions thereof.

21. A data transmitter as in claim 18 wherein said controller suspends said message information substantially immediately when receiving said classification message.

22. A data transmitter as in claim 18 wherein said controller suspends said message information substantially some time after receiving said classification message, at a time to minimize a potential for corruption of said message information.

* * * * *